United States Patent [19]

Hashimoto et al.

[11] Patent Number: 5,179,267

[45] Date of Patent: Jan. 12, 1993

[54] DATA READING AND/OR WRITING APPARATUS OF TYPE USING OPTICAL CARD

[75] Inventors: Akihiko Hashimoto, Hachioji; Toshihiro Kitahara, Akishima; Hiroshi Hashi, Higashimurayama; Takao Rokutan, Koganei, all of Japan

[73] Assignee: Olympus Optical Co., Ltd., Japan

[21] Appl. No.: 614,021

[22] Filed: Nov. 16, 1990

Related U.S. Application Data

[63] Continuation of Ser. No. 393,265, Aug. 14, 1989, abandoned, which is a continuation of Ser. No. 50,472, May 18, 1987, abandoned.

[30] Foreign Application Priority Data

May 23, 1986 [JP] Japan ................... 61-118663
May 28, 1986 [JP] Japan ................... 61-122892
Mar. 17, 1987 [JP] Japan ................... 62-60228

[51] Int. Cl.⁵ ............................................. G06K 7/00
[52] U.S. Cl. .................................. 235/454; 235/440
[58] Field of Search ............... 235/454, 462, 468, 487, 235/436, 470, 475, 466, 487, 488, 492, 439, 485, 440, 447, 456, 480, 457, 474, 461, 463, 476, 477; 382/31; 318/280-286

[56] References Cited

U.S. PATENT DOCUMENTS

| | | |
|---|---|---|
| 4,023,010 | 3/1977 | Horst et al. ............... 235/488 X |
| 4,122,998 | 10/1978 | Eitzer et al. ............... 235/475 |
| 4,254,329 | 3/1981 | Gokey et al. . |
| 4,290,122 | 9/1981 | Bates et al. . |
| 4,528,445 | 7/1985 | Willmore et al. ............... 235/469 |
| 4,562,577 | 12/1985 | Glover et al. . |
| 4,598,196 | 7/1986 | Pierce et al. ............... 235/457 X |
| 4,598,393 | 7/1986 | Pierce et al. . |
| 4,634,850 | 1/1987 | Pierce et al. . |
| 4,652,730 | 3/1987 | Marshall ............... 235/456 X |
| 4,677,604 | 6/1987 | Jelby, III et al. ............... 235/462 X |
| 4,680,460 | 7/1987 | Drexler ............... 235/454 X |
| 4,695,991 | 9/1991 | Hudson . |
| 4,730,293 | 3/1988 | Pierce et al. ............... 235/462 X |
| 4,754,127 | 6/1988 | Brass et al. . |

FOREIGN PATENT DOCUMENTS

| | | |
|---|---|---|
| 3545996 | 7/1986 | Fed. Rep. of Germany . |
| 60-69836 | 4/1985 | Japan . |
| 61-82286 | 4/1986 | Japan . |
| 61-208688 | 9/1986 | Japan . |

Primary Examiner—A. Jonathan Wysocki
Attorney, Agent, or Firm—Parkhurst, Wendel & Rossi

[57] ABSTRACT

An apparatus for reading and writing a data signal from and on an optical card including an optical head having a semiconductor laser for emitting a writing light beam, a light emitting diode for emitting a reading light beam, a first object lens for projecting the reading light spots onto the optical card, a second objective lens for projecting the reading light beam reflected by the optical beam onto a photodetector and a half mirror arranged in an optical axis of the second objective lens, a driving mechanism for moving the optical card in it lengthwise direction, and a focusing control mechanism for moving the optical head in a direction normal to the surface of the optical card.

33 Claims, 16 Drawing Sheets

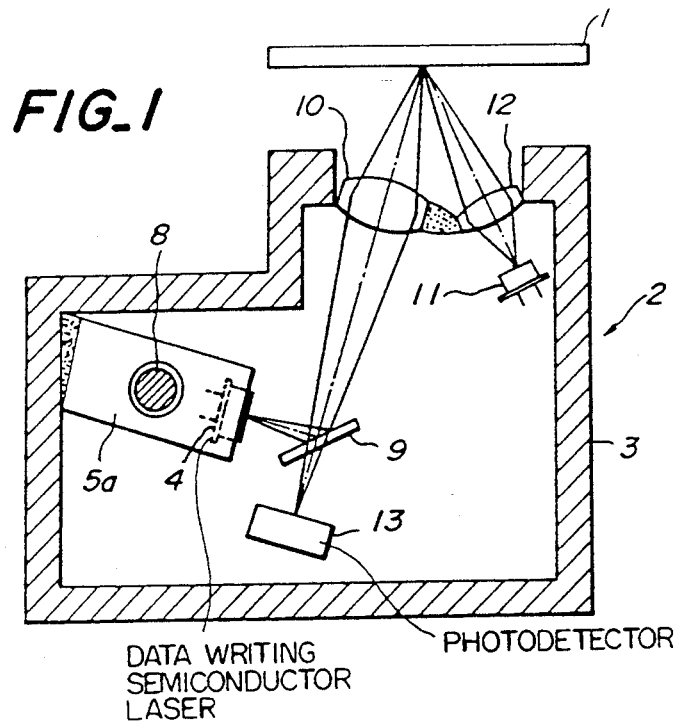
FIG_1
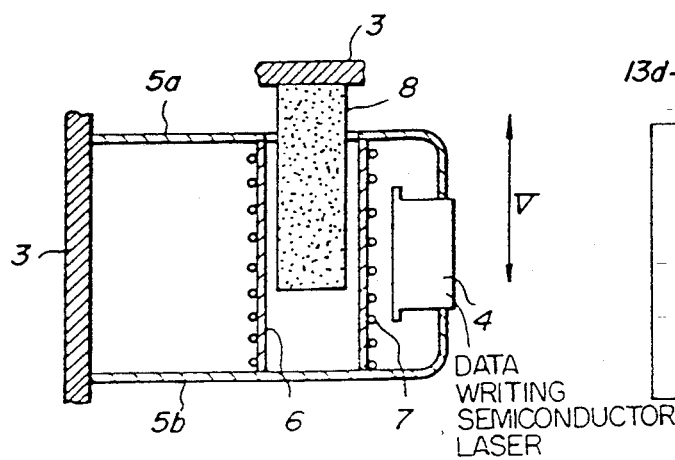
FIG_2
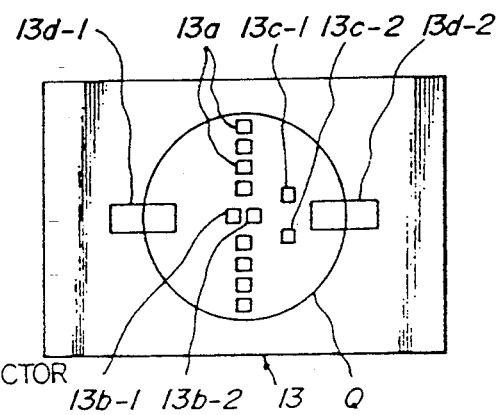
FIG_3

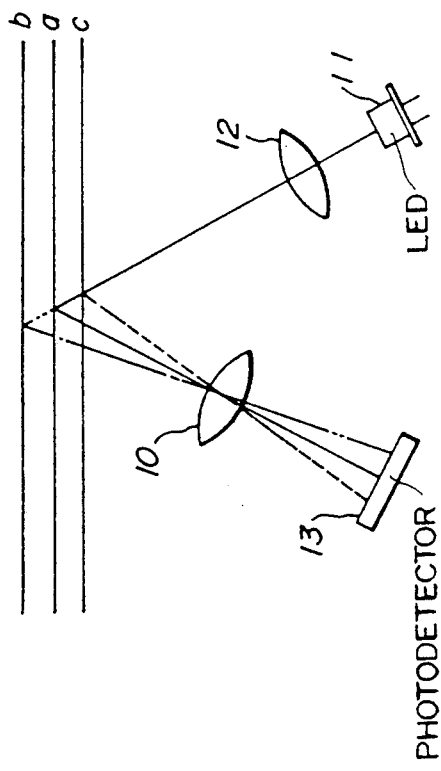
FIG_4
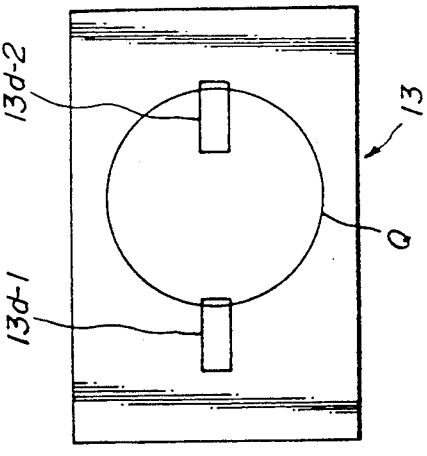
FIG_5A
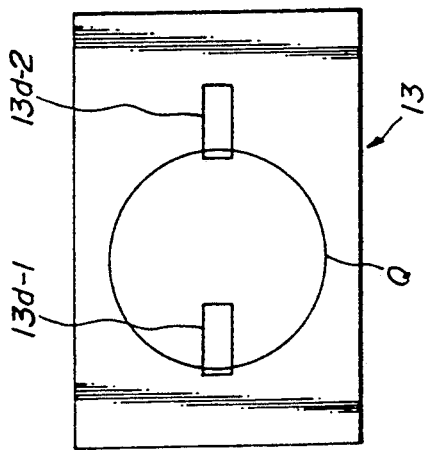
FIG_5B
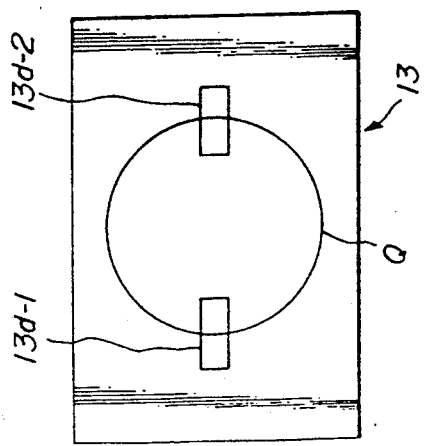
FIG_5C

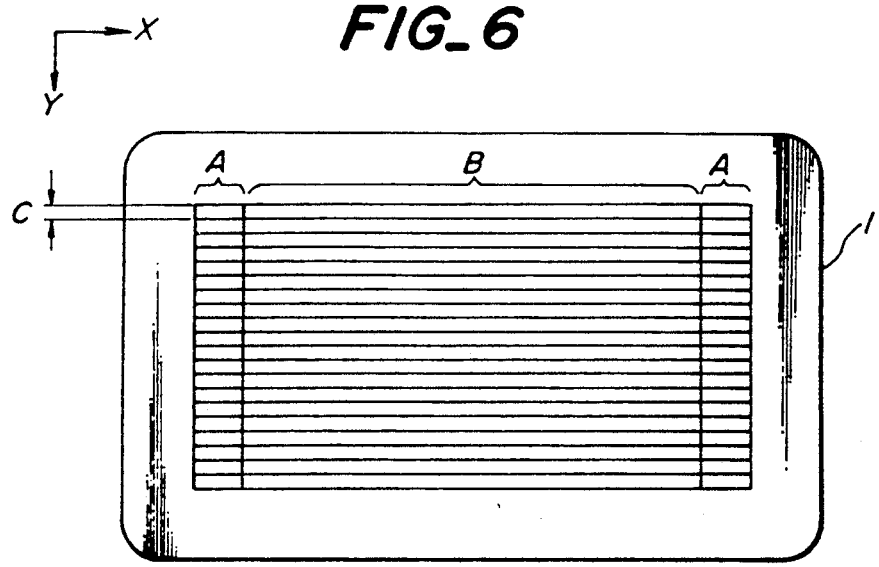
FIG_6
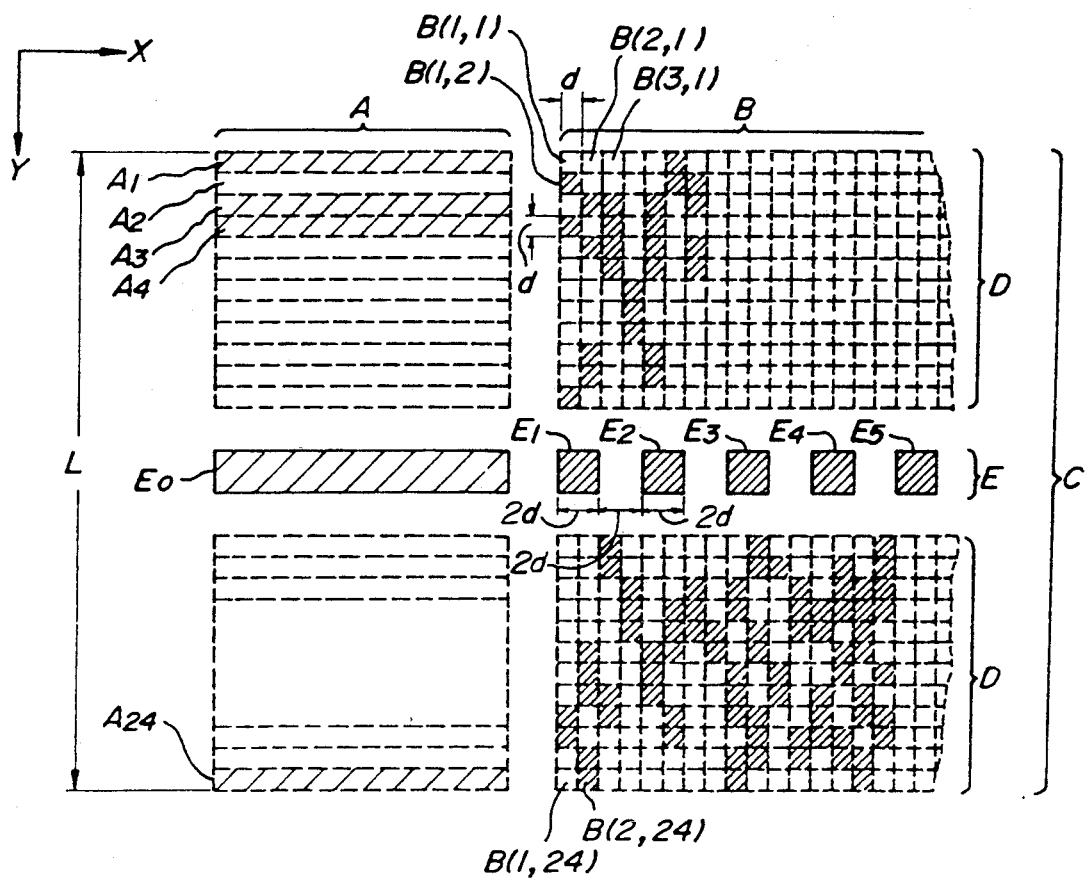
FIG_7

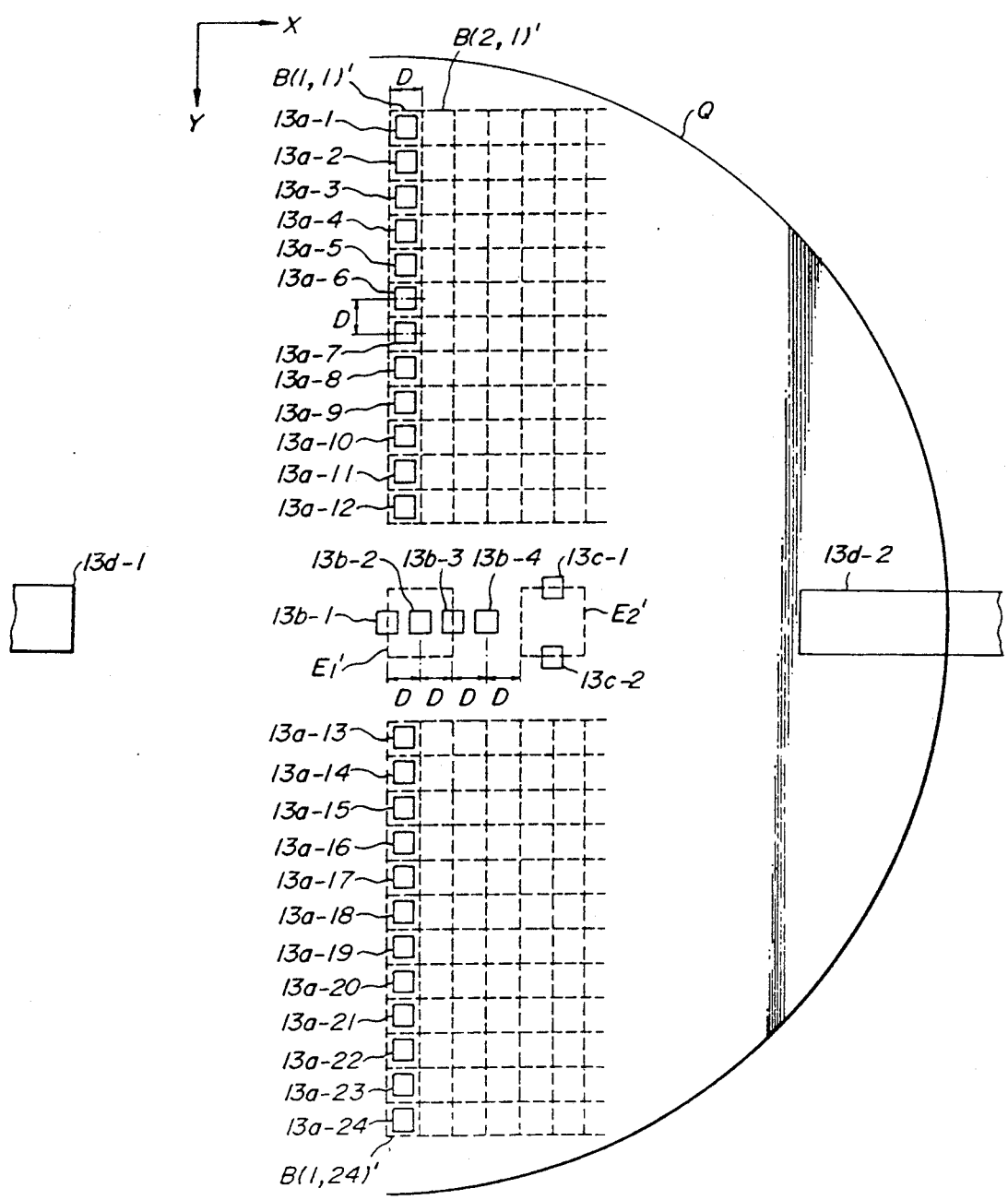
FIG_8

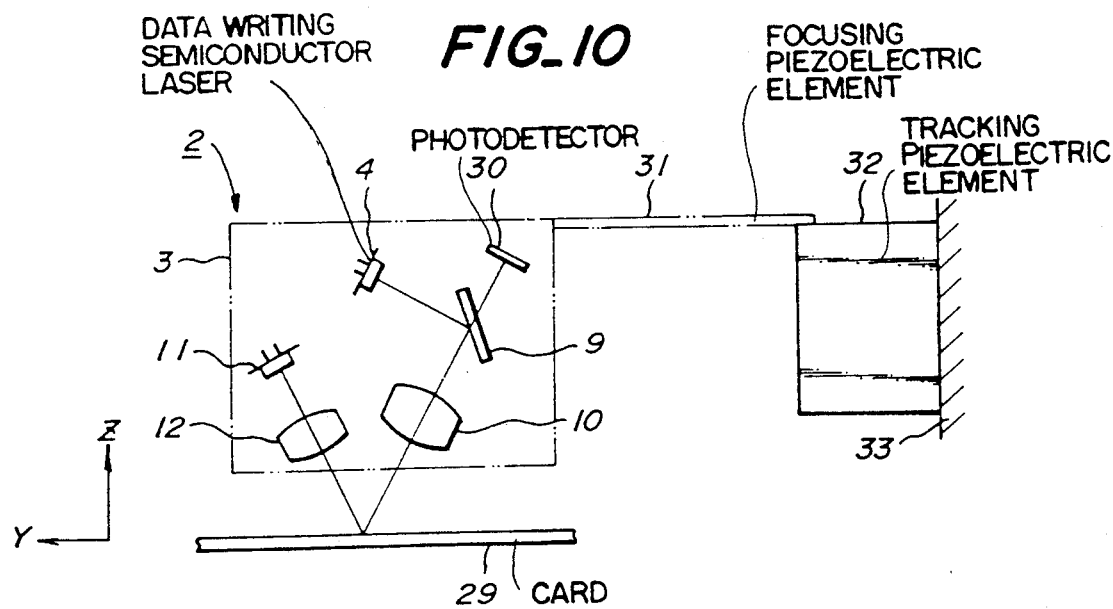
FIG_10
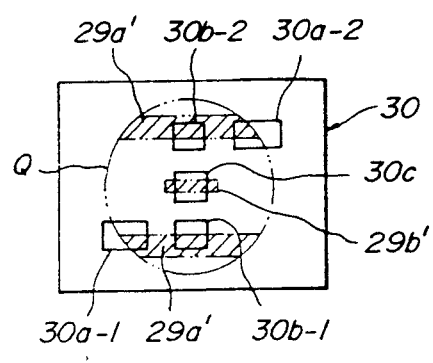
FIG_11

FIG_13
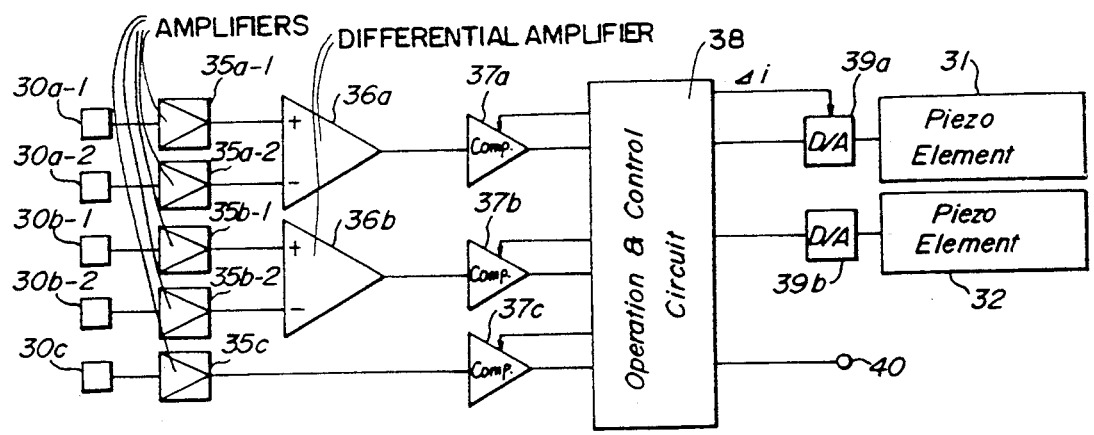
FIG_14A
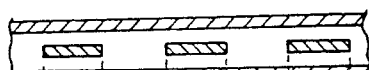
FIG_14B
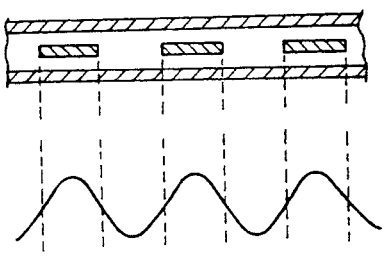
FIG_14C
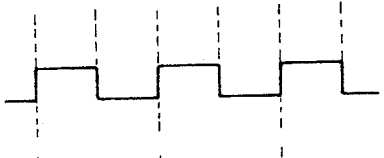
FIG_14D

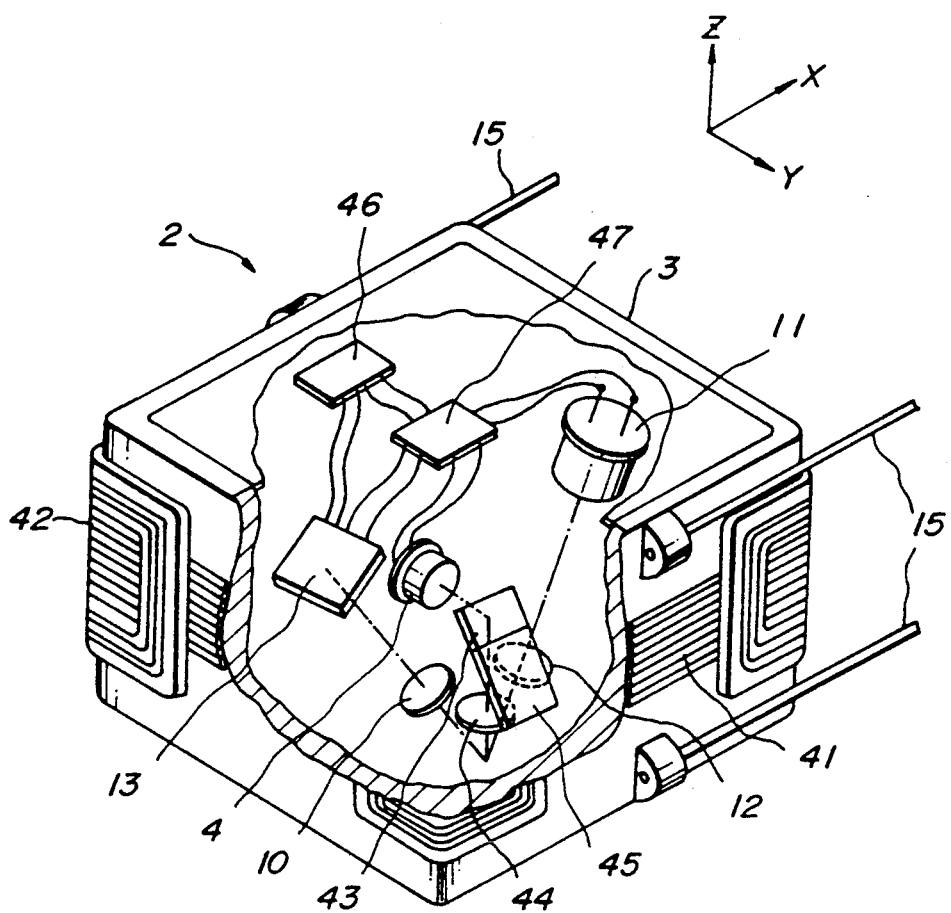
FIG_15

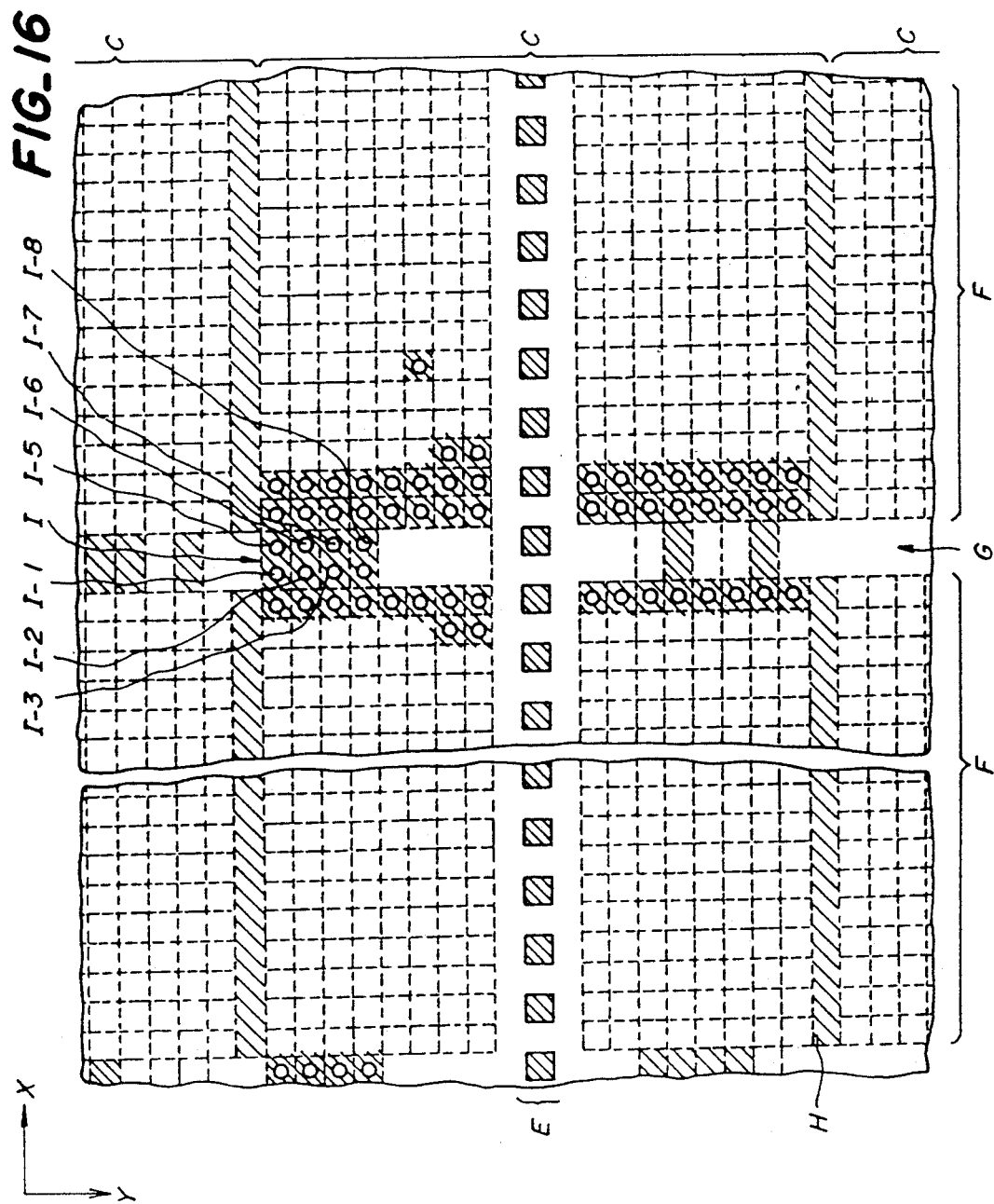

FIG_17
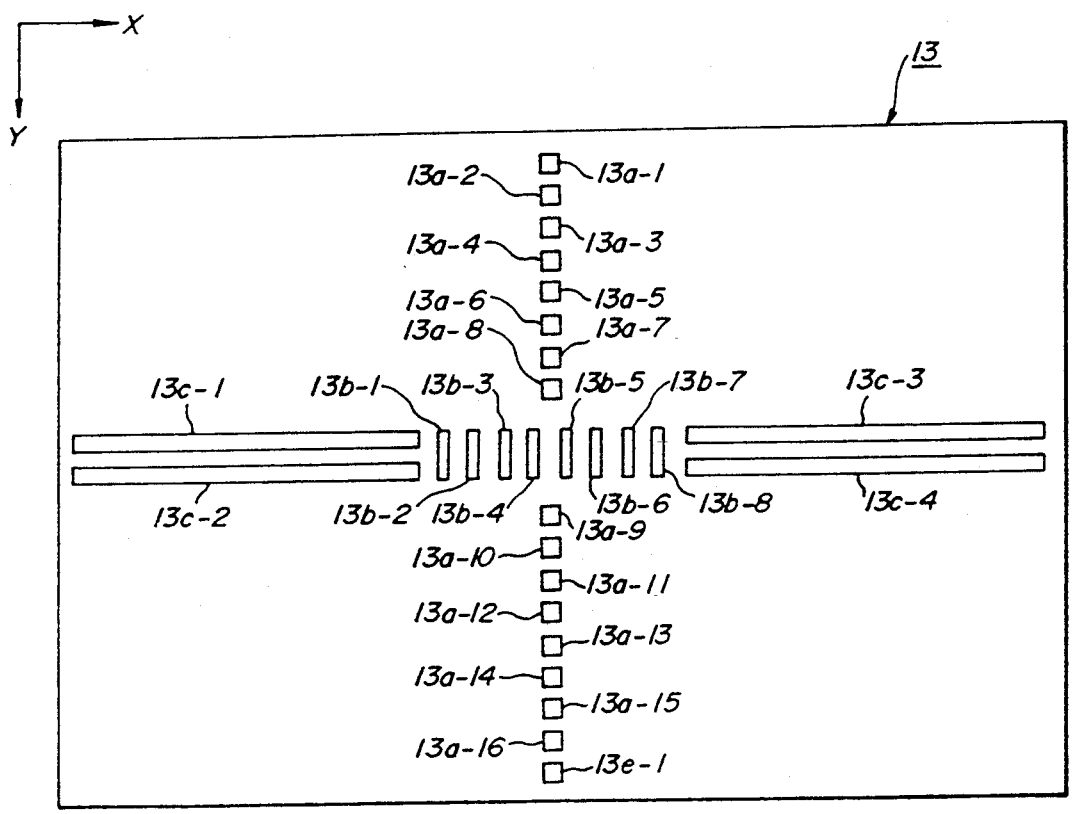

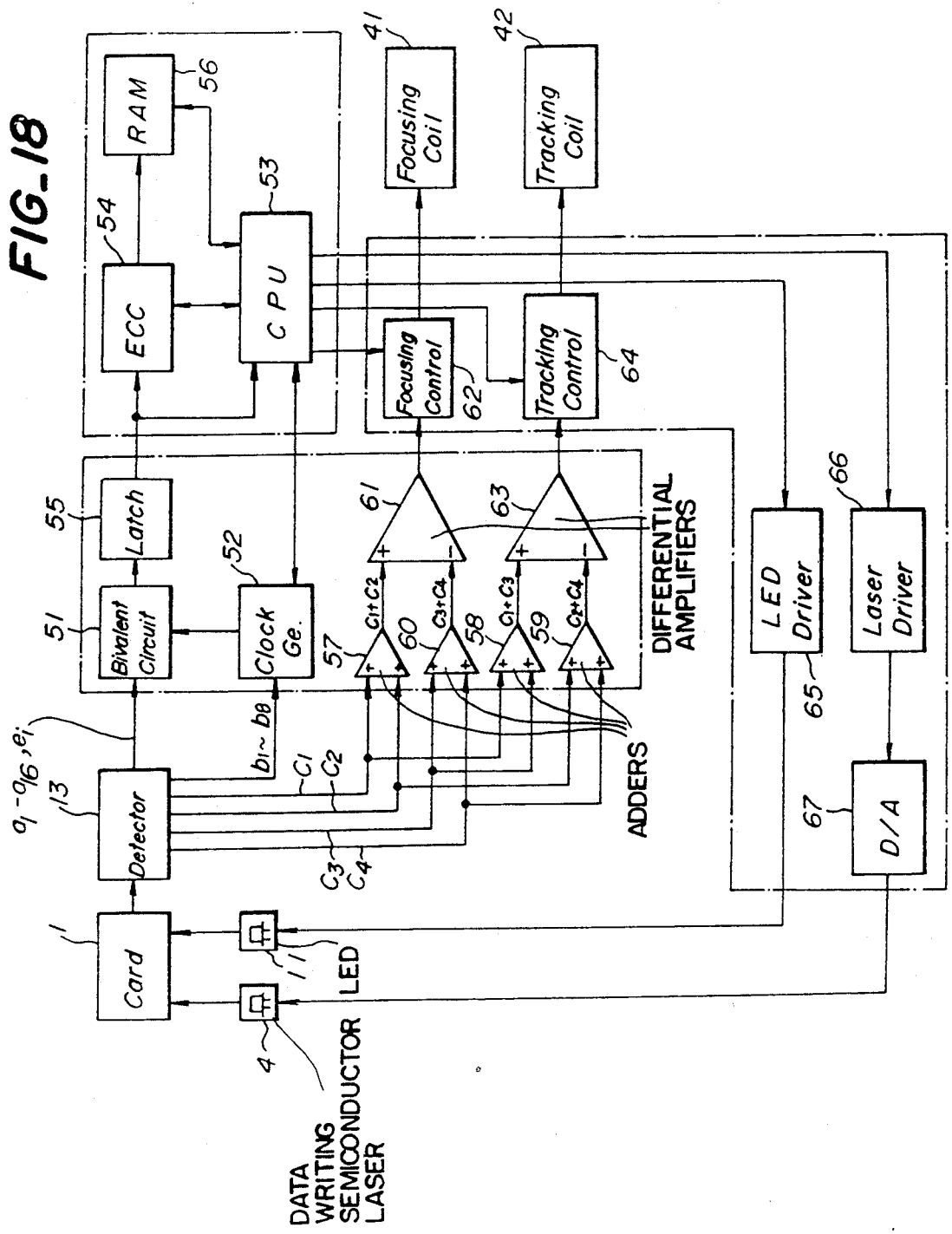

FIG_20
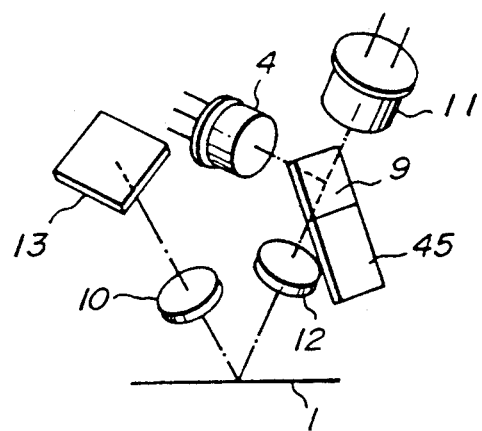
FIG_21
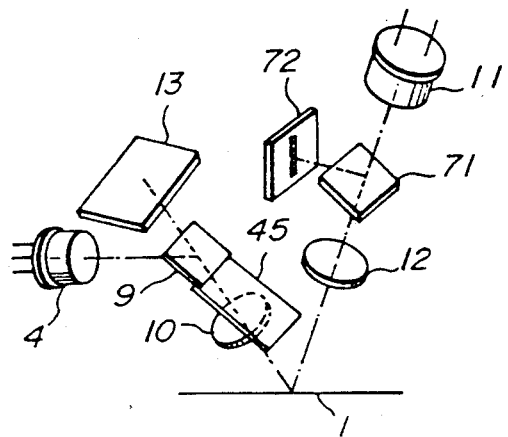

FIG_22
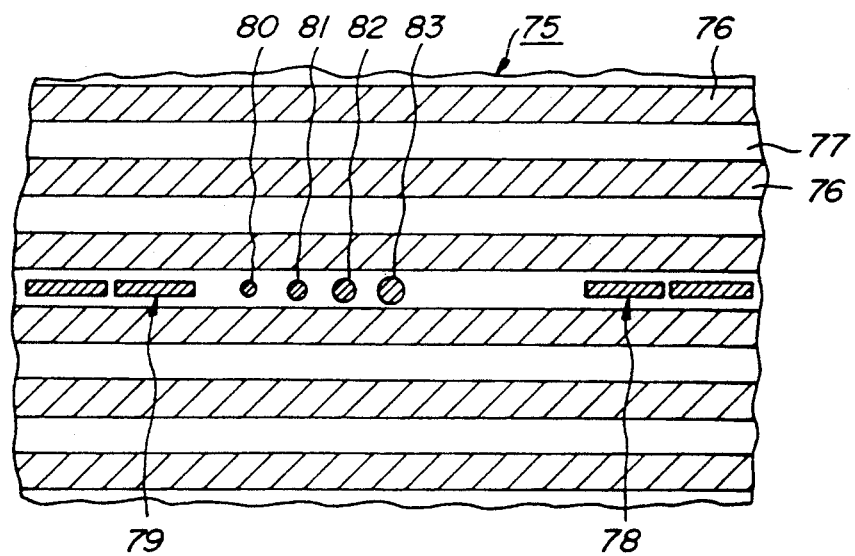
FIG_23
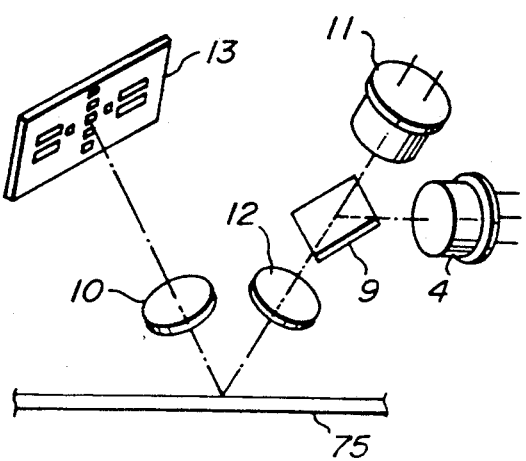

FIG_24
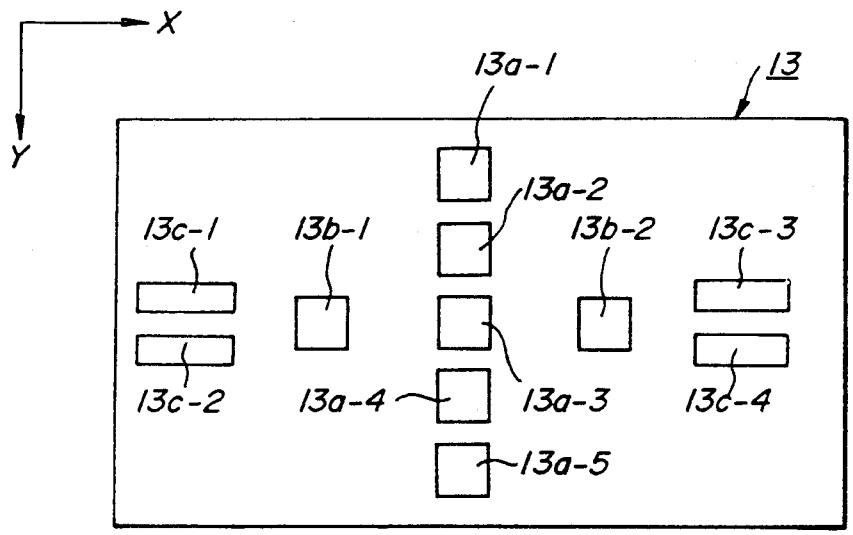
FIG_25
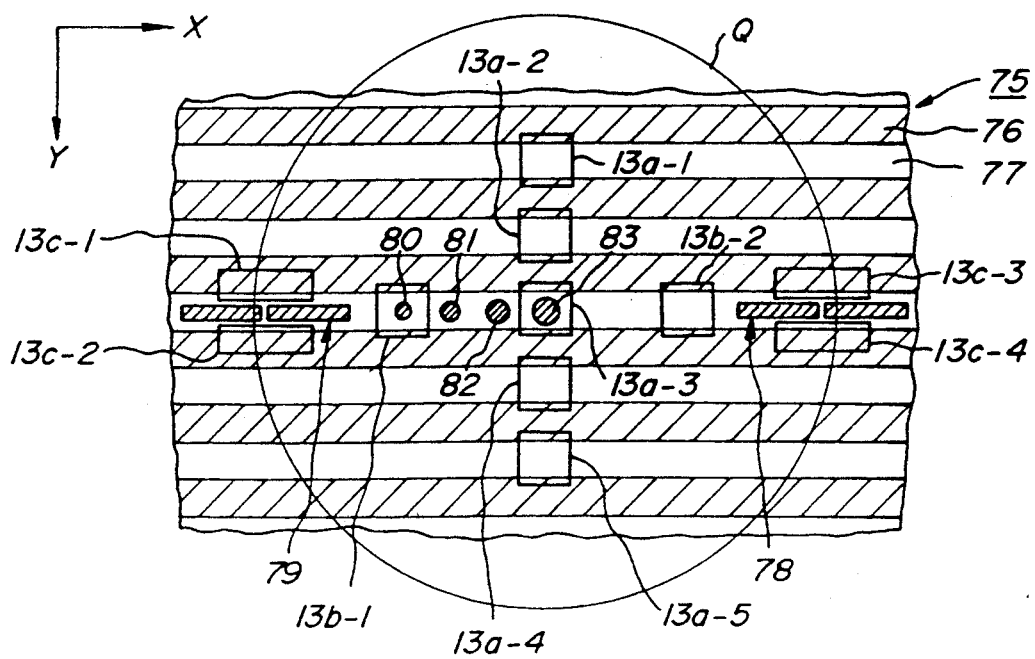

DATA READING AND/OR WRITING APPARATUS OF TYPE USING OPTICAL CARD

This is a continuation of application Ser. No. 07/393,265 filed Aug. 14, 1989, now abandoned, which in turn is a Rule 60 continuation of application Ser. No. 07/050,472 filed May 18, 1989.

BACKGROUND OF THE INVENTION

Field of the Invention and Related Art Statement

The present invention generally relates to an optical data recording and retrieval technique, and more particularly to an apparatus for reading and/or writing a data signal with respect to an optical card.

The optical data recording and retrieval system has been described in many articles. For instance, in U.S. Pat. No. 4,634,850 there is disclosed the optical card read and/or write system. In such a system a quite large amount of data can be stored in a wallet-size card as optically readable pits. In general, on the card there are provided a number of tracks and each track is composed of a plurality of lines. A single byte data is consisting of a plurality of bits which are arranged in a direction Y perpendicular to a direction X in which the tracks extend. In order to readout the data stored on the card a light spot having such a diameter that all pits forming at least a single byte are simultaneously illuminated, and an image of an illuminated portion of the card is formed on a photodetector. The photodetector comprises an array of detectors which corresponds to an array of pits forming the single byte. Therefore, the data signal of the single byte can be read-out simultaneously.

In the optical card reading and/or writing apparatus, a light beam is made incident upon the card generally along an inclined optical path and the reflected light is made incident upon the photodetector also along an inclined optical path. In FIG. 6 of the above mentioned U.S. Pat. No. 4,634,850 there is shown such an optical arrangement. Similar optical arrangements are also shown in Japanese Patent Application Laid-open Publications (Kokai) Nos. 60-69836, 6-82286 and 6-208688. However, there references do not mention anything about the focusing control as well as the tracking control. In order to effect the reading and writing in an accurate manner, it is necessary to perform the focusing control and the tracking control. Particularly, the card is usually carried by a user in his pocket so that the card is liable to be curved. Further, the card reading and/or writing apparatus should have a simple construction mainly due to the fact that its cost has to be reduced. Therefore, during the card is fed with respect to an optical head having light source, photodetector and lenses, a distance between the card and head is liable to vary, so that there might be produced focusing and tracking errors. Further, the feeding speed of the card might be varied and thus the data signal could not be derived accurately and could not be recorded at correct positions on the card. That is to say, it is difficult to make the feeding operation of the card in synchronism with the reading and writing operation. In order to increase a data storage capacity of the card, it is necessary to effect the focusing and tracking control, and to make the data reading and writing operation in synchronism with the feeding of the optical card.

SUMMARY OF THE INVENTION

The present invention has for its object to provide a novel and useful apparatus for reading accurately a data signal out of an optical card, while an image of the card is correctly focused on a photodetector.

It is another object of the invention to provide an apparatus for reading and writing a data signal with respect to an optical card in an accurate manner so that a great large amount of data can be stored on the card at a high record density.

According to the invention, an apparatus for reading a data signal out of an optical card comprises an optical head means including a reading light source for emitting a reading light beam, a first optical system for projecting the reading light beam on an optical card as a reading light spot, a second optical system for forming an image of a part of the optical card which part is illuminated by the reading light spot, and a photodetector for receiving said image of the card and having at least one data detector for reading the data signal to produce a data signal, said first and second optical systems having optical axes which are inclined with respect to a surface of the optical card;

a first driving means for moving said optical card and the optical head means relative to each other in a first direction of the optical card along which first direction a plurality of tracks are recorded on the optical card; and a second driving means for moving said optical card and the optical head means relative to each other in a second direction which is perpendicular to the surface of the optical card; whereby said photodetector comprises at least two focusing detectors which are separated from each other in said first direction such that only in a focused condition the image of the illuminated part of the optical card is equally received by these focusing detectors, and the apparatus further comprises a means for detecting a focusing error by processing output signals from said focusing detectors to generate a focusing control signal by means of which said second driving means is driven to correct the focusing error.

According to further aspect of the invention, an apparatus for reading and writing a data signal with respect to an optical card comprises an optical head means including a reading light source for emitting a reading light beam, a first optical system for projecting the reading light beam on an optical card as a reading light spot, a second optical system for forming an image of a part of the optical card which part is illuminated by the reading light spot, a photodetector for receiving said image of the card and having at least one data detector for reading the data signal, a writing light source for emitting a writing light beam modulated in accordance with a data signal to be written, and a third optical system for projecting the writing light beam onto the optical card, said first and second optical system having optical axes which are inclined with respect to a surface of the optical card;

a first driving means for moving said optical card and the optical head means relative to each other in a first direction of the optical card along which first direction a plurality of tracks are recorded or to be recorded on the optical card; and a second driving means for moving said optical card and the optical head means relative to each other in a second direction which is perpendicular to the surface of the optical card; whereby said photodetector comprises at least two focusing detectors which are separated from each other in said first direction such that only in a focused condition the image of the illuminated part of the optical card is equally received by these focusing detectors, and the apparatus further comprises a means for detecting a focusing error by processing output signals from said focusing detectors to generate a focusing control signal by means of which said second driving means is driven to correct the focusing error.

BRIEF DESCRIPTION OF THE DRAWINGS

FIG. 1 is a schematic cross section showing an optical head of an embodiment of the optical card reading and writing apparatus according to the invention;

FIG. 2 is a cross sectional view depicting a semiconductor laser moving mechanism;

FIG. 3 is a plan view illustrating a construction of a photodetector;

FIGS. 4 and 5A, 5B and 5C are schematic views for explaining the principle of detecting a focusing error according to the invention;

FIG. 6 is a plan view showing an optical card;

FIG. 7 is a schematic view depicting a data format of the card;

FIG. 8 is a schematic view showing a positional relation between the photodetector and images of data pits and control pits formed on the card;

FIG. 10 is a schematic view showing an optical head of another embodiment of the optical card reading and writing apparatus according to the invention;

FIG. 11 is a schematic plan view illustrating a photodetector;

FIG. 13 is a block diagram showing a signal processing circuit;

FIGS. 14A to 14D are waveforms for explaining the operation of the signal processing circuit;

FIG. 15 is a perspective view showing an optical head of still another embodiment of the optical card reading and writing apparatus according to the invention;

FIG. 16 is a data format of an optical card;

FIG. 17 is a plan view showing the construction of a photodetector;

FIG. 18 is a block diagram of a signal processing circuit;

FIGS. 20 and 21 are schematic view illustrating another embodiments of the optical head according to the invention;

FIG. 22 is a plan view showing a data format of still an optical card used in another embodiment of the reading and writing apparatus according to the invention;

FIG. 23 is a schematic view depicting an optical head of this embodiment;

FIG. 24 is a plan view showing a construction of a photodetector; and

FIG. 25 is a schematic view illustrating a positional relation between the photodetector and pits on the card.

DESCRIPTION OF THE PREFERRED EMBODIMENTS

Figure 9:
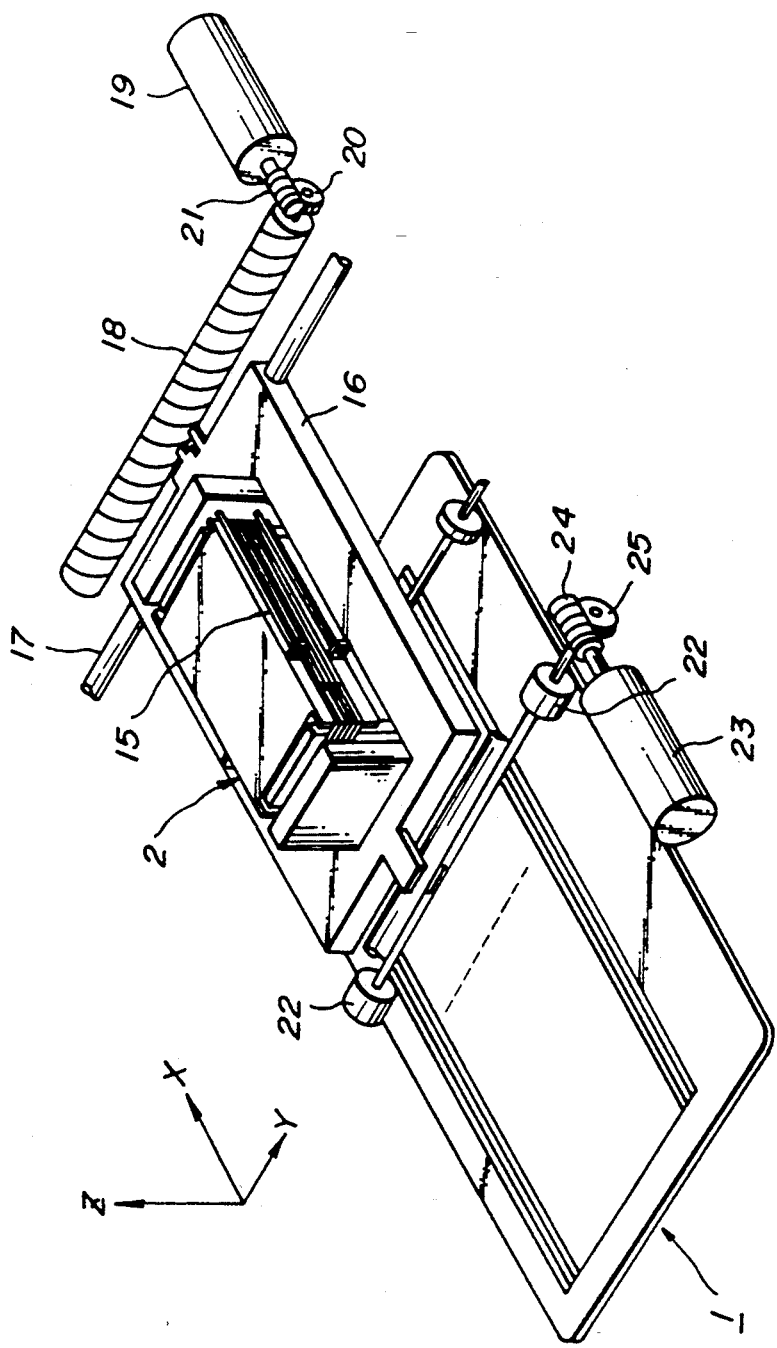
FIG. 9 is a perspective view illustrating a mechanism for moving the head and feeding the card.

FIG. 1 is a schematic cross section showing an embodiment of the optical card reading and writing apparatus according to the invention. In FIG. 1, an optical data storage memory 1 in the form of a wallet-size card is optically scanned by a reading and writing head 2 comprising a housing 3 and a data writing semiconductor laser 4. As clearly shown in FIG. 2, the laser 4 is supported by one ends of a pair of parallel leaf springs 5a and 5b whose other ends are secured to the housing 3. Therefore, the laser 4 can be moved in a direction V. The leaf springs 5a and 5b are connected with each other by means of a bobbin 6 around which is wound a coil 7. Into a central hole of the bobbin 6 is inserted a cylindrical permanent magnet 8 which is secured to the housing 3. When an electric current is passed through the coil 7, the coil is moved in the direction V due to the action of a magnetic field generated by the magnet 8. Therefore, the laser 4 is also moved in the direction V.

A light flux emitted by the laser 4 is reflected by a half mirror 9 toward an objective lens 10. The light flux is focused by the objective lens 10 onto the card 1 as a microscopic spot.

There is further provided a reading light source such as a light emitting diode (LED)11. A light flux emitted form the LED 11 is focused by an objective lens 12 onto the card 1 as a light spot. The light flux reflected by the card 1 is focused by the objective lens 10 onto a photodetector 13 via the half mirror 9. FIG. 3 is a plan view showing an arrangement of detectors of the photodetector 13. The photodetector 13 comprises a data reading detector array 13a-1~13a-N, a pair of clocking detectors 13b, 13c, a pair of tracking detectors 13d, 13e, and a pair of focusing detectors 13f, 13g. In FIG. 3, a circle Q represents the light spot of the reading light beam on the photodetector 13. The pattern of the detectors of the photodetector 13 corresponds to the data format recorded on the card 1. This will be discussed later in detail.

In case of writing the data on the card 1, the laser 4 is made ON and OFF in accordance with the data to be recorded, and at the same time the electric current is passed through the coil 7 to move the laser 4 in the direction V, so that the laser spot is moved in a direction perpendicular to the plane of the drawing of FIG. 1. This direction is a widthwise direction of the card 1. In this manner, the data is recorded on the card 1 in the form of a pit array extending in the widthwise direction. As will be explained later, the LED 11 is energized during the writing operation.

In case of reading the data out of the card 1, the light flux emitted by the LED 11 is focused by the objective lens 12 on the card and an illuminated image is formed on the photodetector 13 by means of the objective lens 10 via the half mirror 9. In FIG. 4, when the card 1 is in a focused position a, the light spot Q is formed at a center of the photodetector 13 and thus the focusing detectors 13f and 13g receive the same amount of light as illustrated in FIG. 5A and produce an output signal having the same amplitude. When the card 1 deviates from the focused position a into defocused positions b and c, the light spot Q is shifted on the photodetector 13 as shown in FIGS. 5B and 5C, respectively. Then output signals of the detectors 13f and 13g become different from each other. It should be noted that in FIGS. 5A to 5C, the other detectors than the focusing detectors 13f and 13g are omitted for the sake of simplicity.

A difference between the output signals from the focusing detectors 13f and 13g is derived by a differential amplifier. In the focused position a the output of the differential amplifier is zero, while in the defocused positions b and c, the output of the differential amplifier becomes positive and negative, respectively, and an amplitude of the output represents an amount or degree of the defocus. In this manner, it is possible to derive a focusing error signal from the differential amplifier. Then, by moving the head 2 in a direction perpendicular to the card 1 in accordance with the thus detected focusing error signal, the light spot Q can be always situated at the center of the photodetector 13 to effect the focusing control. In the present embodiment, the head 2 is moved with respect to the card 1, but the card 1 may be moved with respect to the head 2.

As explained above, in the reading and writing apparatus of this embodiment, the writing light emitted form the laser 4 is projected onto the card 1 along an optical axis of the photodetector 13. This results in an accurate writing as will be explained later. That is to say, the focusing error does not affect the position of pits recorded on the card 1.

FIGS. 6 and 7 show the construction of the card 1. FIG. 6 is a plan view illustrating the record format on the card 1 and FIG. 7 shows a format of a single track on an enlarged scale. The record area of the card 1 is divided into two address sections A and one data section B viewed in a lengthwise direction X. These address and data sections A and B are further divided into a number of track units C viewed in a widthwise direction Y of the card 1. It should be noted that the two address sections A are provided at both ends of the card 1, so that the card can be read from both ends of the card in the direction X. As shown in FIG. 7, the track unit C is composed of a plurality of data tracks D and one control track E. In the present embodiment, there are arranged twelve data tracks D on respective sides of the control track E, and data pits in these twelve data tracks constitute a single byte. A width L of the track unit C is about 100 μm. In each address section A of respective track units C, there are alotted twenty four lines $A_1$ to $A_{24}$, and in the extreme lines $A_1$ and $A_{24}$ there are always formed pits to constitute a fixed pattern for identifying the track unit. The remaining twenty two lines $A_2$ to $A_{23}$ are used to record a track unit number. It should be noted that in these lines $A_2$ to $A_{23}$, in addition to the track unit number there may be recorded various kinds of information such as indices of an electronic dictionary and a mark for denoting whether a relevant track unit has been already recorded or not. In the address section A, there is further formed a tracking pit $E_0$. In the control track E of the data section B, there are formed a number of control pits $E_1$, $E_2$, ... having a rectangular shape. These control pits serve to generate a clock signal and a tracking error signal as will be explained later. In the data tracks D there are alotted a number of data pit regions B(1,1), B(1,2) ... B(1,24); B(2,1), B(2,2) ... B(2,24); B(3,1) ... . In FIG. 7, hatched regions denote data pits in which one of logic signals 1 and 0 has been already written. For instance, the hatched data pits represent a logic low level (0) and non-hatched regions denote a logic high level (1). Each of the data pits has a length w and width w viewed in the directions X and Y. Then each of the control pits $E_1$, $E_2$ ... has a width 2w and successive control pits are separated by a distance 2w. In the present card 1, the control pits $E_1$, $E_2$ ... are aligned with arrays of data pits B (n,m) viewed in the direction Y. Therefore, the control pits $E_1$, $E_2$ ... are arranged in the direction X at a pitch 4w. Therefore, a second control pit $E_2$ is aligned with respect to fifth and sixth data arrays B(5,1), B(5,2) ... B(5,24) and B(6,1), B(6,2) ... B(6,24) viewed in the direction Y.

FIG. 8 shows a detailed construction of the photodetector 13. In FIG. 8 images of the data pits and control pits are also shown by broken lines and are denoted by the corresponding reference numerals with dash. Further, in FIG. 8 the light spot image formed on the photodetector 13 is shown by a circle Q. The light spot on the card 1 is imaged by the objective lens 10 on the photodetector 13 at an enlargement factor k. The photodetector 13 comprises two arrays of data detectors 13a-1 to 13a-12 and 13a 13 to 13a-24 arranged on respective sides of the control track, four clocking detectors 13b-1 to 13b-4, two tracking detectors 13c-1 and 13c-2, and two focusing detectors 13d-1 and 13d-2. The data detectors are arranged at a pitch W (W=k·w) in the direction Y and the clocking detectors 13b-1~13b-4 are arranged at a pitch W in the direction X. Further, the tracking detectors 13c-1 and 13c-2 are separated in the direction Y by a pitch 2W.

FIG. 9 is a perspective view showing the head driving mechanism. The head 2 is supported by four resilient rods or wires 15 movably in the direction Y as well as in a direction Z perpendicular to the X and Y directions. That is to say, the direction Z is normal to the surface of card 1. The wires 15 are connected to a plate 16 which is slidably supported by a guide rod 17 extending in the direction Y. One end of the plate 16 is engaged with a screw 18 which is rotated by a motor 19 via gears 20 and 21. The card 1 is moved in the direction X by means of rollers 22 and a motor 23 which are coupled with each other by gears 24 and 25. When the motor 19 is energized, the head 2 is moved in the direction Y and when the motor 23 is energized, the card 1 is moved in the direction X. Further, by driving the head 2 in the direction Y, it is possible to effect the tracking control. Further when the head 2 is moved in the direction Z, it is possible to effect the focusing control.

Now the data reading operation will be explained. At first, the card 1 is moved in the direction X by driving the motor 23 so that the address section A of the card 1 is moved under the head 2. Then the motor 19 is energized to move the head 2 in the direction Y to effect the so-called seek. During this seek movement, output signals from the tracking detectors 13c-1 and 13c-2 are compared with each other. When a tracking pit $E_0$ in an address section A is equally detected by the tracking detectors 13c-1 and 13c-2, output signals from the outermost data detectors 13a-1 and 13a-24 are checked. As explained above, in the outermost lines $A_1$ and $A_{24}$ in the address section A there are always formed pits. Then it can be confirmed that the head 2 has been correctly positioned with respect to a track C. Next, by processing output signals from the data detectors 13a-2 to 13a-23, a track number is readout. When the thus readout track number is a desired one, the readout operation is initiated. But if the readout track number is different from the desired one, the seek operation is continued until a desired track is detected.

In order to readout two byte data stored in the first array of the data pits B(1,1) to B(1,24), it is necessary to align accurately the data detectors 13a-1 to 13a-24 with respect to the first data pit array as illustrated in FIG. 8. By detecting a difference between output signals from the clocking detectors 13b-1 and 13b-3 by means of a differential amplifier, it is possible to detect a deviation between the data detectors and the data pit array in the direction X. That is to say, a polarity of the difference represents the direction of the deviation and an amplitude of the difference signal expresses an amount of the deviation. When the difference signal decreases below a predetermined low level, it can be confirmed that the data pits B(1,1) to B(1,24) are correctly aligned to the data detectors 13a-1 to 13a-24, respectively. Then there is produced a clock pulse. At the same time, output signals from the tracking detectors 13c-1 and 13c-2 are compared with each other by a differential amplifier to generate a tracking error signal. It should be noted that when the tracking detectors 13c-1 and 13c-2 are situated between successive control tracks $E_1'$, and $E_2'$, there could not be produced the tracking error signal. Therefore, the output signal of the tracking differential amplifier is gated by gate pulses synchronized with the clock pulses. That is to say, only when the tracking detectors 13c-1 and 13c-2 receive the image $E_i'$ of the control pit $E_i$, the tracking error signal is derived. The head 2 is moved in the direction Y in accordance with the tracking error signal by means of an electromagnetic driving mechanism which is commonly used in the optical disc read/write system or optical disc player. The clock pulse is also used to gate out output signals supplied from the data detectors 13a-1 to 13a-24. That is to say, when the clock pulse is generated, the output signals from the data detectors are sampled and held. In this manner, the driving mechanism for moving the card 1 in the direction X can be free from severe requirement.

The card 1 is further moved in the direction X and a second data pit array B(2,1), B(2,2) ... B(2,24) is to be readout. In this case, a clock pulse is generated by deriving a difference between output signals from the clocking detectors 13b-2 and 13b-4. In synchronism with the thus generated clock pulse, the tracking control and the data readout are effected. Further, in case of reading out a third data pit array B(3,1)~B(3,24), output signals form the first and third clocking detectors 13b-1 and 13b-3 are used again to generate a clock pulse.

In the above embodiment, the recording laser beam emitted from the laser 4 is deflected in the direction Y by moving the laser light source with the aid of the moving coil 7. It should be noted that the recording laser beam may be deflected in the direction Y by means of various mechanisms. For instance, a relay lens arranged between the laser 4 and the objective lens 10 may be moved by a moving coil mechanism. Further, the half mirror 9 or a reflection mirror may be swung by a mechanism having piezoelectric elements.

FIG. 10 shows schematically a head of another embodiment of the optical card reading and writing apparatus according to the invention. In the present embodiment portions similar to those of the previous embodiment are denoted by the same reference numerals. The optical head 2 comprises a housing 3 in which are arranged laser diode 4 for emitting a writing laser beam, half mirror 9, objective lens 10, light emitting diode 11, objective lens 12 and photodetector 30. The construction within the housing 3 is entirely same as that of the previous embodiment, and the light flux emitted from the light emitting diode 11 is projected upon a card 29 in an inclined fashion and the writing light beam emitted from the laser diode 4 is made incident upon the card 29 along the optical axis of the photodetector 30. The housing 3 is coupled via a focusing piezoelectric element 31 and a tracking piezoelectric element 32 with a fixed member 33 such as a casing of the apparatus. Therefore, by driving the focusing piezoelectric element 31, the housing 3 is moved in the direction Z perpendicular to the surface of the card 29, and by driving the tracking piezoelectric element 32, the housing 3 is moved in the direction Y.

FIG. 11 is a plan view showing the construction of the photodetector 30. The photodetector 30 comprises two focusing detectors 30a-1, 30a-2, two tracking detectors 30b-1, 30b-2, and a single data reading detector 30a. The focusing detectors 30a-1 and 30a-2 are arranged symmetrically to the detector 18c, and similarly the tracking detectors 13b-1 and 13b-2 are provided symmetrically to the data reading detector 18c.

Figure 12A:
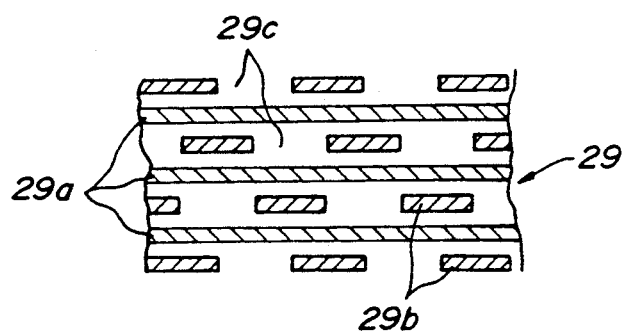
FIGS. 12A and 12B are plan and cross sectional views, respectively of an optical card.
Figure 12B:
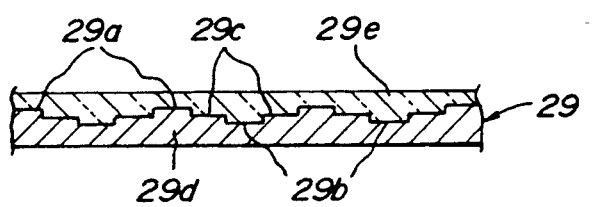

FIGS. 12A and 12B are plan and cross sectional views of the card 29 of the present embodiment. The card 29 comprises a number of track units each being composed of two pre-record sections 29a and a write section 29b situated therebetween. As shown in FIG. 12B, the pre-record section 29a is situated above a reference level 29c, and the write section 29b is situated below the reference level 29c. The pre-record section 29a is used to derive a tracking error signal, and the write section 29b is used to write data therein. When the light spot is focused on the pre-record section 29a, the spot is defocused on the write section 29b and vice versa. The pre-record section 29a, write section 29b and reference level 29c are formed on a substrate 29d and a transparent protection layer 29e is applied or the substrate 29d.

When the light beam emitted from the light emitting diode 11 is just focused on the pre-record section 29a and no tracking error occurs, images 29a' of two adjacent pre-record sections are equally formed on the focusing and tracking detectors 30a-1, 30b-1 and 30a-2, 30b-2 as illustrated in FIG. 11. When a tracking error occurs in one direction, an amount of light impinging upon one tracking detector 30b-1 is increased and that upon the other tracking detector 30b-2 is decreased. Further, when a focusing error occurs in one direction, an amount of light impinging upon one focusing detector 30a-1 is increased and that upon the other focusing detector 30a-2 is decreased.

FIG. 13 is a block diagram showing a signal processing circuit for effecting the focusing and tracking controls. Output signals from the focusing detectors 30a-1 and 30a-2 are supplied via amplifiers 35a-1 and 35a-2 to a differential amplifier 36a, and an output signal from the differential amplifier 36a is supplied via a comparator 37a to an operation and control circuit 38. Similarly outputs of the focusing detectors 30b-1 and 30b-2 are connected via amplifiers 35b-1 and 35b-2, respectively to a differential amplifier 36b whose output is connected via a comparator 37b to the operation and control circuit 38. An output signal of the data reading detector 30c is connected through an amplifier 35c and a comparator 37c to the operation and control circuit 38.

In the operation and control circuit 38, a focusing error is detected from the output signal of the comparator 37a to produce a focus error signal which is supplied to the focusing piezoelectric element 31 via a D/A converter 39a. Further the operation and control circuit 38 generates a tracking error signal in accordance with the output signal from the comparator 37b, and the tracking error signal is supplied to the tracking piezoelectric element 32 by means of a D/A converter 39b. The operation and control circuit 38 processes the output signal from the comparator 37c and produces a data signal at an output terminal 40. The operation and control circuit 38 further functions to produce a focus correction signal $\Delta_i$ which is supplied to the D/A converter 39a, so that a difference in the level between the pre-record section 29a and the write section 29b can be compensated for. This will be further explained.

At first the head 2 is moved by the piezoelectric elements 31 and 32 by means of the focusing and tracking error signals in such a manner that the output signals from the differential amplifiers 36a and 36b become zero. After the focusing and tracking controls have been completed, the focus correction signal $\Delta_i$ is supplied from the circuit 38 to the D/A converter 39a so that the light spot is focused on the write section 29b. Then, the detector 30c generates an output signal shown in FIG. 14B in accordance with the pattern of the write section 29b illustrated in FIG. 14A. Then the comparator 35c produces the output signal shown in FIG. 14D. In the present embodiment, in synchronism with a raising edge of the output signal from the comparator 37c, there is produced a gate signal shown in FIG. 14D and during this gate signal the focus correction signal $\Delta_i$ is cut off for a short time and the focusing and tracking controls are effected with respect to the pre-record section 29a. After that the focus correction signal $\Delta_i$ is supplied to the D/A converter 39a so that the writing light beam is focused on the write section 29b. After the head 2 has become stationary, the data is detected.

FIG. 15 is a perspective view showing a head of another embodiment of the card reading and writing apparatus according to the invention. In this embodiment, portions similar to those of the previous embodiments are denoted by the same reference numerals. A housing 3 of the head 2 is supported by four resilient wires 15 movably in the directions Y and Z so as to effect the tracking control and focusing control. For this purpose, on an outer surface of the housing a focusing coil 41 is wound and four tracking coils 42 of flat shape are also wound on the focusing coil 41. By generating magnetic fluxes passing through the focusing coil 41 and parts of the tracking coils 42 which parts extend in the direction Z, the housing 3 can be moved in the directions Z and Y by conducting currents through the coils 41 and 42, respectively.

In the housing 3 are arranged semiconductor laser 4, objective lens 10 and 12, light emitting diode 11 and photodetector 13. In this embodiment, a writing laser beam emitted from the semiconductor laser 4 is reflected by a mirror 43 and then is focused on a card not shown by means of an objective lens 44 along an optical path which is perpendicular to the surface of the card. The mirror 43 is secured to the housing 3 via a piezoelectric bimorph cell 45 so that the laser light spot can be moved on the card in the direction Y. The semiconductor laser 4, light emitting diode 1, and photodetector 13 are connected to ICs 46 and 47 via conductors. A reading light beam emitted from the light emitting diode 11 is made incident upon the card along an inclined optical path, and a light reflected from the card is made incident upon the photodetector 13 also along an inclined optical path. An incident plane containing these inclined optical paths is made normal to the surface of the card.

FIG. 16 shows a format of a card which is used in conjunction with the head 2 shown in FIG. 15. In this embodiment, each track unit C is divided into a number of frames F and data is recorded at a unit of frame. Each track unit C is further divided into twenty lines, and in a tenth line there are formed control track E for detecting clock pulses, focusing error and tracking error. In twentieth line there is formed a frame line H for detecting a frame synchronizing signal. Above and below the control track E there are arranged data byte arrays. In this embodiment, each byte is constituted by eight bits. In front of each frame F there is provided a frame number section G in which a frame number is recorded. In FIG. 16, portions denoted by hatching are black area and the remaining portions are white. In the frame number section G, the frame number is recorded by using twelve to nineteenth lines, and an area constituted by first line fourth lines is used as a pre-write section I for determining an intensity of the recording laser beam. In this embodiment, the pre-write section I is divided into eight portions $I_1$ to $I_8$. This will be explained later. At least in the frame and frame number sections F and G, the card comprises a surface layer having a low reflection and a record layer formed by gelatin having dispersed therein color former of silver group which is changed from a high reflection (representing a high level 1 of bivalent signal) into a low reflection (representing a low level 0 of bivalent signal). A number of circular parts of the record layer are exposed from the low reflective surface layer.

FIG. 17 is a plan view showing a detector pattern of the photodetector 13. The photodetector 13 comprises sixteen data reading detectors $13a\text{-}1 \sim 13a\text{-}8$ and $13a\text{-}9 \sim 13a\text{-}16$ which correspond to data pits of a data array extending in the direction Y, eight clocking detectors $13b\text{-}1 \sim 13b\text{-}4$ arranged in the direction X at a constant pitch, four tracking and focusing detectors $13c1 \sim 13c\text{-}4$, and a detector $13e\text{-}1$ for detecting the frame line H. The tracking and focusing detectors $13c\text{-}1 \sim 13c\text{-}4$ are extended in the direction X and detectors $13c\text{-}1$ and $13c\text{-}2$ are aligned in the direction Y and the detectors $13c\text{-}3$ and $13c\text{-}4$ are also aligned in the direction Y. As can be seen from FIG. 17, the detectors are arranged substantially in a cross.

FIG. 18 is a block diagram of a signal processing circuit of the apparatus. Outputs of the detectors $13a\text{-}1 \sim 13a\text{-}16$ and $13e\text{-}1$ are connected to a bivalent circuit 51 and outputs of the detectors $13b\text{-}1 \sim 13b\text{-}8$ are supplied to a clock generator circuit 52. In the clock generator circuit 52, a first sum of outputs from the detectors $13b\text{-}1$, $13b\text{-}3$, $13b\text{-}5$ and $13b\text{-}7$ and a second sum of outputs from the detectors $13b\text{-}2$, $13b\text{-}4$, $13b\text{-}6$ and $13b\text{-}8$ are derived, and then a difference between the first and second sums to generate clock pulses under the control of a central processing unit (CPU) 53. The clock pulses thus generated are supplied to the bivalent circuit 51 and CPU 53. In the bivalent circuit 51, the outputs from the detectors $13a\text{-}1 \sim 13a\text{-}16$ and $13e\text{-}1$ are converted into bivalent signals in synchronism with the clock pulses. The bivalent signals are supplied to the CPU 53 and an error correction circuit (ECC) 54 via a latch circuit 55. The ECC 54 corrects errors in the readout data signal under the control of the CPU 53 and the corrected data signal is stored in a RAM 56.

Output $C_1$ from the detector $13c\text{-}1$ is supplied to adders 57 and 58, output $C_2$ from the detector $13c\text{-}2$ is supplied to adders 57 and 59, output $C_3$ from the detector $13c\text{-}3$ are supplied to adders 60 and 58, and output $C_4$ from the detector $13c\text{-}4$ are supplied to adders 60 and 59. Then output $C_1+C_2$ from the adder 57 and output $C_3+C_4$ from the adder 60 from the adder 60 are supplied to a first differential amplifier 61 to derive a difference therebetween, and the difference thus derived is supplied to a focus control circuit 62. Further, a difference between outputs $C_1+C_3$ and $C_2+C_4$ from the adders 58 and 59 is derived by a second differential amplifier 63 and then is supplied to a tracking control circuit 64. The focus control circuit 62 detects a focusing error and supplies a focusing error correction signal to the focusing coil 41 in accordance with the detected focusing error. The tracking control circuit 64 detects a tracking error and supplies a tracking error correction signal to the tracking coil 42. In this manner it is possible to effect the focusing control and tracking control.

The CPU 53 controls the light emitting diode 11 via a light emitting diode driving circuit 65 so that the optical card 1 is spot-illuminated. The CPU 53 further controls the semiconductor laser 4 via laser driving control circuit 66 and A/D converter 67 so that data is recorded on the card 1.

The bivalent circuit 51, clock generator circuit 52, latch circuit 55, adders 57 to 60 and differential amplifiers 61 and 63 are constructed by the IC 46, and the focusing and tracking control circuits 62 and 64, LED driving circuit 65, laser driving circuit 66 and D/A converter 67 are formed by the IC 47. As shown in FIG. 15 the ICs 46 and 47 are arranged near the photodetector 13 in the housing 3 of the head 2, and thus the signal processing circuit is hardly affected by noise.

Now the operation of the apparatus will be explained. The data is readout or recorded in synchronism with the clock signal obtained by processing the outputs from the detectors $13b$-$1 \sim 13b$-$8$, while the card 1 and head 2 are relatively moved in the direction X.

Figure 19:
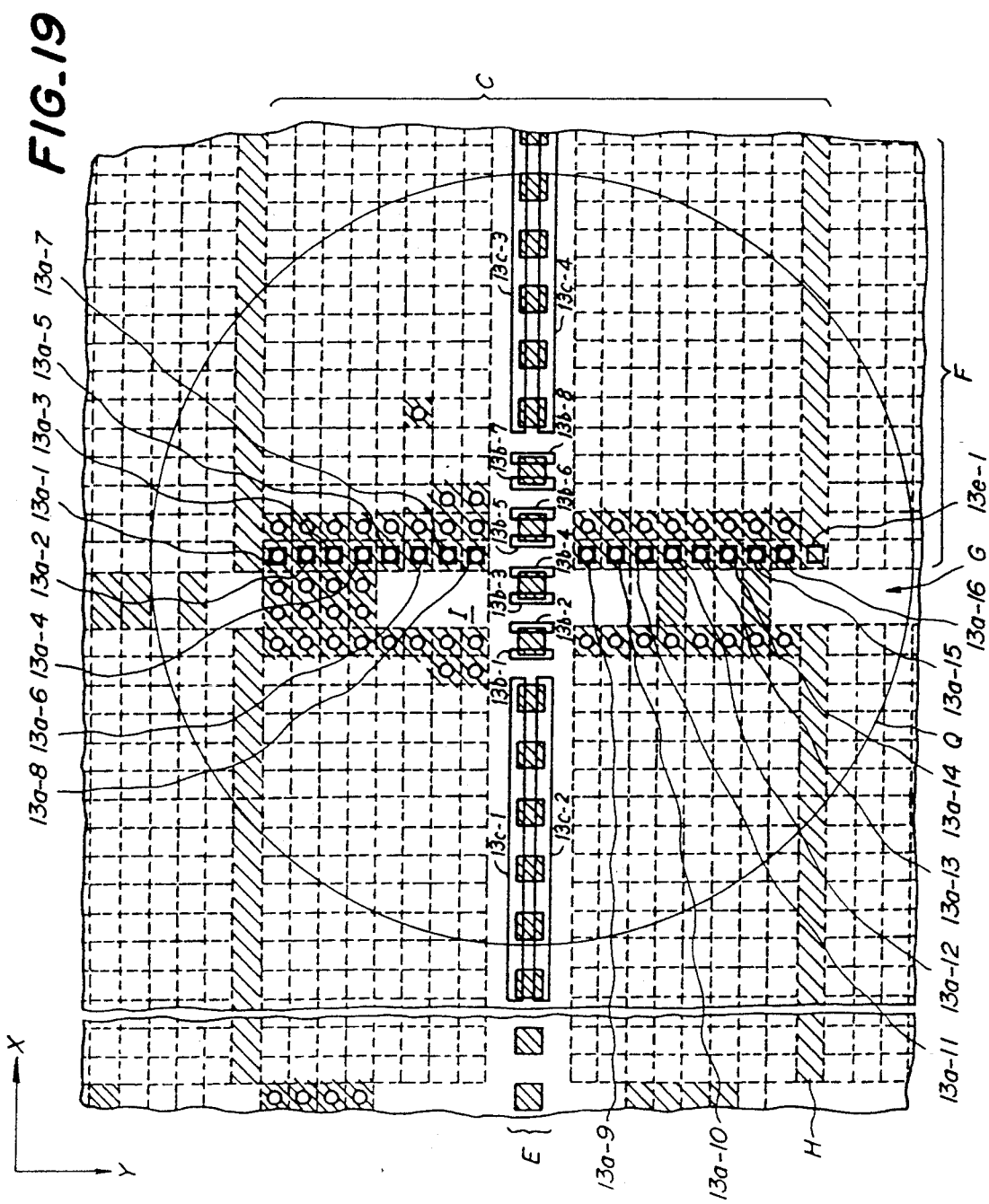
FIG. 19 is a schematic view depicting a positional relation between the photodetector and the pits on the card.

In the readout mode, the semiconductor laser 4 is deenergized, and only the light emitting diode 11 is driven, so that the card 1 is illuminated by the beam spot Q as shown in FIG. 19. The image of the spot Q is formed on the photodetector 13. While the focusing control and tracking control are effected by processing the output signals from the detectors $13c$-$1 \sim 13c$-$4$, the output signal from the detectors $13a$-$1 \sim 13a$-$16$ and $13e$-$1$ are readout in synchronism with the clock pulses generated by processing the output signals from the detectors $13b$-$1 \sim 13b$-$8$ to derive the data signal and frame synchronizing signal. The data signal is stored in the RAM 56 via the ECC 54.

In the writing mode, the light emitting diode 11 is also energized to effect the focusing and tracking controls and to generate the clock pulse. In synchronism with the clock pulse, the writing beam from the semiconductor laser 4 is modulated in accordance with a data signal to be recorded, and the data is written in a given frame F. Prior to such a writing operation, an intensity of the writing light has to be determined. To this end, the writing beam is projected onto the write portions I-1 ~ I-4 successively by rotating the mirror 43 with the aid of the bimorph cell 45, while the intensity of the writing beam is changed into different levels. Then the outputs from the detectors $13a$-$1 \sim 13a$-$4$ are detected to check the recorded condition of the write portions I-1 ~ I-4. Next the writing beams having different intensities are made incident upon the write portions I-5 ~ I-8 successively, and the recorded condition of these pre-write portions is detected by processing the outputs from the detectors $13a$-$1 \sim 13a$-$4$. In order to change the intensity of the writing laser beam emitted from the semiconductor laser 4 in the manner mentioned above, the eight laser driving current levels (digital values) have been set in the laser driving circuit 66. While the writing laser beam is moved in the direction Y by means of the bimorph cell 45, the intensity of the writing beam is made such a level at which no recording is carried out, and the outputs from the detectors $13a$-$1 \sim 13a$-$4$ are detected. After it has been confirmed that the writing beam is made incident on one of the pre-write portion I-1 ~ I-8, the intensity of the writing beam is increased to a predetermined level. In this manner, the recording can be performed at a correct position.

After the output signals from the detectors $13a$-$1 \sim 13a$-$4$ have been stored in the CPU 53 by scanning the pre-write portions I-1 ~ I-8 with the writing beam, the CPU 53 selects the minimum intensity level of the writing beams by means of which the bivalent signal "0" has been recorded on a pre-write portion. Then the data signal is recorded on the frame F by using the writing beam having the minimum intensity thus detected. Also in the recording operation, prior to the actual recording the intensity of writing beam is reduced to the non-recordable level so that a position of the card on which the writing beam is made incident is checked.

In the present embodiment, before the recording operation, the suitable intensity of the writing beam is detected by using the pre-write section I situated between successive frames F. Therefore, the data signal can be recorded accurately on the card 1 without being influenced by temperature and sensitivity of the card, ambient temperature, variation in intensity of light emitted by the semiconductor laser 4, so that the record capacity of the card can be utilized to the maximum extent.

FIG. 20 illustrates another embodiment of the optical system of the head according to the invention. In this embodiment, the light emitted from the light emitting diode 11 is made incident upon the card 1 in an inclined fashion via the half mirror 9 and the objective lens 12. The light reflected from the card 1 is made incident upon the photodetector 13 by means of the objective lens 10. The writing beam emitted from the semiconductor laser 4 is reflected by the half mirror 9 and is made incident upon the card 1 by the objective lens 12 in an inclined fashion. The light reflected by the card 1 is made incident upon the photodetector 13 by means of the objective lens 10. In order to move the writing beam in the direction Y on the card 1, the half mirror 9 is moved by the bimorph cell 45. In the present embodiment, the objective lens 44 may be deleted as compared with the embodiment shown in FIG. 15, so that the number of parts can be reduced, the assembling work becomes easy and the cost can be decreased.

FIG. 21 shows still another embodiment of the optical head according to the invention. The arrangement of the light emitting diode 11, objective lenses 10 and 12 and photodetector 13 is the same as the previous embodiments. In the present embodiment, the writing laser beam emitted from the semiconductor laser 4 is reflected by the half mirror 9 arranged in the reflection light path of the illumination light, and then is made incident upon the card 1 by means of the objective lens 10. The writing beam reflected by the card 1 is made incident upon an additional photodetector 72 via the objective lens 12 and an additional half mirror 71 which is arranged in a projection light path of the illumination light emitted from the light emitting diode 11. The half mirror 9 is moved by the bimorph cell 45 so that the writing laser beam is moved in the direction Y of the card 1. The additional photodetector 72 has an array of sixteen detectors 72a-1 similar to the detectors 13a-1 to 13b-16 of the photodetector 13. By processing the output signals from the detector array of the additional photodetector 72, it is possible to confirm that the writing beam is made incident upon a desired data pit position, and then the intensity of the writing beam is increased to the previously determined level to record a data signal.

In the present embodiment, the writing beam is made incident upon the card 1 along the optical axis through which the reading light reflected by the card is made incident upon the photodetector 13. Therefore, even if there is a slight focusing error, it is possible to record the data signal at a correct position on the card.

FIG. 22 illustrates another embodiment of the track format of the optical card. A card 75 comprises a number of data tracks 77 divided by guide tracks 76. That is to say, the data track 77 is formed by a single line. Each data track 77 is divided into a number of sectors by sector start patterns 78 and sector end patterns 79 viewed in the direction X.

In the recording operation, the writing beam is made incident upon a space between the sector start pattern 78 of a relevant sector and the sector end pattern 79 of a preceding sector at different intensity levels to form pre-write portions 80~83, while the card 75 is fed leftward. The record condition of these prewrite portions 80~83 is checked to determine the optimal intensity of the writing beam. The recording on the sector is effected with the thus detected intensity level of the writing beam.

FIG. 23 depicts an optical system of the optical head in the present embodiment. The optical system of the head of this embodiment is similar to that shown in FIG. 10, so that its explanation is omitted. However, the construction of the photodetector 13 is somewhat different from that of the photodetector 13 shown in FIG. 10.

FIG. 24 illustrates the construction of the photodetector 13 shown in FIG. 23. The photodetector 13 comprises a first array of detectors 13a-1~13a-5 extending in the direction Y, a second array of detectors 13b-1 and 13b-2 extending in the direction X and four focusing and tracking detectors 13c-1~13c-4.

FIG. 25 shows an image of the card 75 formed on the photodetector. By processing output signals from the detectors 13c-1~13c-4 it is possible to perform the focusing and tracking controls. The pre-write portions 80~83 are detected by the detector 13b-1 so that the optimum intensity of the writing beam is determined. It should be noted that the detector 13b-2 is used to detect the recording condition of another write portions, when the card 75 is fed rightward. In the present embodiment, five data tracks 77 are simultaneously readout by means of the five detectors 13a-1~13a-5 arranged in the direction Y, so that the reading can be performed within a short time period.

What is claimed is:

1. An apparatus for reading a data signal from an optical card which contains a number of track units, each including at least one control track having control pits and extending in a first direction, a plurality of data tracks each having a plurality of data pits arranged on at least one side of said control track, said data pits being arranged in said first direction and in a second direction which is perpendicular to said first direction, the apparatus comprising:
a read out head including illuminating means for projecting a single light spot having a dimension large enough for simultaneously illuminating a plurality of said pits of said control track and said data tracks;
photodetecting means including at least one control detector for receiving an image of said control track, and a plurality of data detectors for receiving images of said plurality of data pits aligned in said second direction;
driving means for moving the optical card and the read out head relative to each other in said first direction and in said second direction; and
data signal generating means for deriving a data signal by sampling output signals supplied from said plurality of data detectors in synchronism with a clock pulse which is derived from an output signal supplied from said at least one control detector.

2. An apparatus according to claim 1, further comprising servocontrolling means for effecting tracking servo control and focusing servo control such that said light spot is made incident upon the optical card correctly in accordance with a tracking control signal and a focusing control signal, respectively, which are derived by processing the output signal supplied from said at least one control detector.

3. An apparatus according to claim 2, wherein said illuminating means comprises a light emitting diode for emitting a light beam and a lens for projecting the light beam upon the optical card as said single light spot.

4. An apparatus according to claim 2, wherein said plurality of data detectors is aligned substantially in said second direction.

5. An apparatus according to claim 4, wherein said photodetecting means further comprises a plurality of control detectors for receiving the image of the control track, said plurality of control detectors being aligned in said first direction.

6. An apparatus according to claim 5, wherein said photodetecting means further comprises a plurality of image detectors for receiving the image of the control track, said plurality of image detectors being aligned in said second direction.

7. An apparatus according to claim 2, wherein said driving means comprises a first driving device for moving the optical card in said first direction and a second driving device for moving the read out head in said second direction.

8. An apparatus according to claim 7, wherein said illuminating means and said photodetecting means comprise a common housing, and said servo controlling means includes a focusing control coil for moving the housing in a third direction which is perpendicular to the optical card and a tracking control coil for moving the housing in said second direction.

9. An apparatus for writing a data signal on an optical card which contains a number of track units, each including at least one prerecorded control track and an area on which a plurality of data tracks of a track unit may be written, said control and data tracks extending in parallel with each other in a first direction; the apparatus comprising an optical head including:
a reading light source for emitting a reading light beam which is modulated in accordance with a data signal to be written on the optical card;

a writing light source for emitting a writing light beam having a constant intensity;

an optical system for projecting the reading light beam onto the optical card as a large spot having a diameter which is at least equal to a width of one of said track units and projecting the writing light beam onto the optical card as a small light spot having a diameter which is substantially equal to a width of one of said tracks; and photodetecting means including at least one control detector for receiving an image of said control track to derive a clock pulse; and driving means for moving the optical head and the optical card relative to each other in said first direction as well as a second direction perpendicular to said first direction; whereby the data signal is written on said plurality of data tracks of said track unit in synchronism with said clock pulse.

10. An apparatus according to claim 9, wherein said optical head further comprises a scanning device for scanning the writing light beam in the second direction over the width of the area on which said plurality of data tracks are written.

11. An apparatus according to claim 10, wherein said scanning device comprises a mirror for reflecting the writing light beam, and a driving device for moving the mirror such that the writing light beam moves in said second direction.

12. An apparatus according to claim 11, wherein said driving device comprises a piezoelectric bimorph having one end connected to the mirror and the other end coupled with a base member of the optical head.

13. An apparatus according to claim 9, wherein said driving means comprises a first driver for moving the optical card in said first direction and a second driver for moving the optical head in said second direction.

14. An apparatus according to claim 13, further comprising a servo controlling means for controlling focusing and tracking in accordance with an output signal supplied from said control detector to control positions of the reading and writing light beams on the optical card.

15. An apparatus according to claim 9, wherein said photodetecting means includes a plurality of pairs of control detectors for receiving the image of the control track, and said clock pulse is produced by deriving differences between output signals supplied from said pairs of control detectors.

16. An apparatus according to claim 15, further comprising a second photodetecting means having a plurality of data detectors for detecting the writing light beam reflected by the optical card at respective data track positions, so that after confirming the correct position of the writing beam on the optical card by means of output signals from said control detectors, the intensity of the writing light beam is varied.

17. An apparatus according to claim 9, wherein said reading light source comprises a light emitting diode and said writing light source comprises a semiconductor diode.

18. An apparatus for reading and writing a data signal out of and on an optical card which contains a number of track units, each including at least one prerecorded control track having control pits and extending in a first direction, and an area on which a plurality of data tracks may be written, each data track having data pits and extending in said first direction, comprising:

a housing including a reading light source for emitting a reading light beam which is modulated in accordance with a data signal to be written on the card;

an optical system for projecting the reading light beam onto the optical card as a large light spot having a dimension large enough for illuminating simultaneously a plurality of said pits of said control and data tracks of at least one of said track units;

a writing light source for emitting a writing light beam having a constant intensity;

an optical system for projecting the writing light beam onto the optical card as a small light spot having a diameter which is substantially equal to a width of one of said tracks;

and photodetecting means including at least one control detector for receiving an image of said at least one control track to derive a clock pulse, said data signal being written on said plurality of data tracks of said track unit in synchronism with said clock pulse, said photodetecting means further including a plurality of data detectors for receiving images of said plurality of data tracks;

driving means for moving the optical card and the housing relative to each other in said first direction as well as in a second direction perpendicular to said first direction; and data signal generating means for deriving said data signal by sampling output signals supplied from said plurality of data detectors in synchronism with said clock pulse.

19. An apparatus according to claim 18, further comprising servo controlling means for effecting tracking servo control and focusing servo control such that said large light spot is made incident upon the optical card correctly in accordance with a tracking control signal and a focusing control signal, respectively, which are derived by processing the output signal supplied from said at least one control detector.

20. An apparatus according to claim 19, wherein said reading light source comprises a light emitting diode for emitting a light beam and a lens for projecting the light beam upon the optical card as said large light spot.

21. An apparatus according to claim 19, wherein said plurality of data detectors is aligned substantially in said second direction.

22. An apparatus according to claim 21, wherein said photodetecting means comprises a plurality of control detectors for receiving the image of the control track, said plurality of control detectors being aligned in said first direction.

23. An apparatus according to claim 22, wherein said photodetecting means further comprises a plurality of image detectors for receiving the image of the control track, said plurality of image detectors being aligned in said second direction.

24. An apparatus according to claim 19, wherein said driving means comprises a first driving device for moving the housing in said first direction and a second driving device for moving the housing in said second direction.

25. An apparatus according to claim 24, wherein said photodetecting means is provided in said housing, and said servo controlling means includes a focusing control coil for moving the housing in a third direction which is perpendicular to the optical card and a tracking control coil for moving the housing in said second direction.

26. An apparatus according to claim 18, wherein said housing further comprises a scanning device for scanning the writing light beam in the second direction over the width of the area on which said plurality of data tracks are written.

27. An apparatus according to claim 26, wherein said scanning device comprises a mirror for reflecting the writing light beam, and a driving device for moving the mirror such that the writing light beam moves in said second direction.

28. An apparatus according to claim 27, wherein said driving device comprises a piezoelectric bimorph having one end connected to the mirror and the other end coupled with a base member of the apparatus.

29. An apparatus according to claim 18, wherein said driving means comprises a first driver for moving the optical card in said first direction and a second driver for moving the housing in said second direction.

30. An apparatus according to claim 29, further comprising a servo controlling means for controlling focusing and tracking in accordance with an output signal supplied from said control detector to control positions of the reading and writing light beams on the optical card.

31. An apparatus according to claim 18, wherein said photodetecting means includes a plurality of pairs of control detectors for receiving the image of the control track, and said clock pulse is produced by deriving differences between output signals supplied from said pairs of control detectors.

32. An apparatus according to claim 31, further comprising a second photodetecting means having a plurality of data detectors for detecting the writing light beam reflected by the optical card at respective data track positions, so that after confirming the correct position of the writing beam on the optical card by means of output signals from said control detectors, the intensity of the writing light beam is varied.

33. An apparatus according to claim 18, wherein said reading light source comprises a light emitting diode and said writing light source comprises a semiconductor diode.

* * * * *